US012074793B2

(12) United States Patent
Takei et al.

(10) Patent No.: US 12,074,793 B2
(45) Date of Patent: Aug. 27, 2024

(54) L2 SWITCH, COMMUNICATION CONTROL METHOD, AND COMMUNICATION CONTROL PROGRAM

(71) Applicant: Nippon Telegraph and Telephone Corporation, Tokyo (JP)

(72) Inventors: Yuki Takei, Musashino (JP); Masayuki Nishiki, Musashino (JP); Masato Nishiguchi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/013,454

(22) PCT Filed: Jul. 1, 2020

(86) PCT No.: PCT/JP2020/025921
§ 371 (c)(1),
(2) Date: Dec. 28, 2022

(87) PCT Pub. No.: WO2022/003883
PCT Pub. Date: Jan. 6, 2022

(65) Prior Publication Data
US 2023/0254248 A1  Aug. 10, 2023

(51) Int. Cl.
*H04L 45/745* (2022.01)
*H04L 45/00* (2022.01)

(52) U.S. Cl.
CPC ............ *H04L 45/66* (2013.01); *H04L 45/745* (2013.01)

(58) Field of Classification Search
CPC ..... H04L 45/66; H04L 45/745; H04L 45/306; H04L 45/74; H04L 49/206
See application file for complete search history.

(56) References Cited

U.S. PATENT DOCUMENTS

| 2012/0210416 A1* | 8/2012 | Mihelich | H04L 47/125 726/11 |
| 2013/0343387 A1* | 12/2013 | Stroud | H04L 45/74 370/392 |

(Continued)

FOREIGN PATENT DOCUMENTS

| CN | 103460653 A | * 12/2013 | H04L 45/125 |
| EP | 2693696 A1 | * 2/2014 | H04L 45/125 |

(Continued)

*Primary Examiner* — Alina A Boutah
(74) *Attorney, Agent, or Firm* — Fish & Richardson P.C.

(57) ABSTRACT

A level 2 (L2) switch receives a packet of upstream communication and a packet of downstream communication that are transmitted from a network device. Further, in a case where it is determined whether or not the received packet is a packet of upstream communication, and when it is determined that the packet is of session upstream communication and is a packet at a session start time, the L2 switch acquires session information and destination information included in the packet of the upstream communication, and stores in a session table. Further, when it is determined that the packet is of upstream communication and is not a packet at a session start time, and destination information of the packet is different from destination information stored in the session table, the L2 switch updates the destination information of the packet to the destination information stored in the session table.

9 Claims, 10 Drawing Sheets

(56) References Cited

U.S. PATENT DOCUMENTS

| | | | | |
|---|---|---|---|---|
| 2013/0343389 | A1* | 12/2013 | Stroud | H04L 45/72 370/392 |
| 2015/0003457 | A1* | 1/2015 | Sugiyama | H04L 41/0816 370/392 |
| 2015/0180767 | A1* | 6/2015 | Tam | H04L 47/36 370/389 |
| 2016/0094444 | A1* | 3/2016 | MeLampy | H04L 67/146 370/392 |
| 2016/0212048 | A1* | 7/2016 | Kaempfer | H04L 45/745 |
| 2017/0346709 | A1* | 11/2017 | Menon | H04L 45/70 |
| 2018/0176177 | A1* | 6/2018 | Bichot | H04L 41/40 |
| 2020/0213225 | A1* | 7/2020 | Han | H04L 47/829 |
| 2020/0412814 | A1* | 12/2020 | Kawatani | H04L 67/145 |

FOREIGN PATENT DOCUMENTS

| | | | | | |
|---|---|---|---|---|---|
| EP | 3342127 | B1 | * | 11/2021 | H04L 45/38 |
| JP | 2004229130 | A | * | 8/2004 | |
| JP | WO2003007160 | A1 | * | 11/2004 | |
| JP | 2004349925 | A | * | 12/2004 | |
| JP | 2019068297 | | | 4/2019 | |
| WO | WO-2004107683 | A1 | * | 12/2004 | H04L 49/25 |
| WO | WO-2016094037 | A1 | * | 6/2016 | H04L 45/38 |

\* cited by examiner

L2 SWITCH, COMMUNICATION CONTROL METHOD, AND COMMUNICATION CONTROL PROGRAM

CROSS-REFERENCE TO RELATED APPLICATIONS

This application is a National Stage application under 35 U.S.C. § 371 of International Application No. PCT/JP2020/025921, having an International Filing Date of Jul. 1, 2020, the disclosure of which is considered part of the disclosure of this application, and is incorporated by reference in its entirety into this application.

TECHNICAL FIELD

The present invention relates to an L2 switch, a communication control method, and a communication control program.

BACKGROUND ART

Against a background of increase in communication volume and the like in recent years, each network function (NF) is required to have high performance such as transfer of large-volume traffic. There is a technology for providing functions such as a load balancer and a firewall by a plurality of network functions in communication via a network, for example, communication between a terminal and a server. In the above technology, in a case where transfer of the large-capacity traffic is performed on the network or the like, a scale-out method of distributing processing to a plurality of NF devices is used. Here, in a case where the NF device provides a function such as the firewall or the like described above, it may be necessary for upstream communication and downstream communication of the communication to pass through the same NF device.

In such a case, a layer 2 (L2) switch is arranged in a subsequent stage of the NF device so that communication in an upstream direction (upstream communication) and communication in a downstream direction (downstream communication) of the communication pass through the same NF device. Then, the L2 switch stores session information and destination information of the received upstream communication. Further, a technology has been proposed in which, when the L2 switch receives downstream communication for the upstream communication, the downstream communication is transferred to the same NF device as the NF device through which the upstream communication has passed, on the basis of the session information and the destination information of the upstream communication (see, for example, Patent Literature 1.). In addition, in such a technology, load distribution of each NF device is conventionally realized by a method using Hash (for example, per-flow equal cost multi path: ECMP).

CITATION LIST

Patent Literature

Patent Literature 1: JP 2019-068297 A

SUMMARY OF INVENTION

Technical Problem

In the above-described conventional technology, there has been a problem that session interruption occurs when there is a change in a network configuration accompanied by increase or decrease in the number of NF devices in the up/down symmetrical communication using the L2 switch. For example, conventionally, when the number of NF devices in a distribution destination is increased or decreased, the distribution destination is determined again by hash calculation. Therefore, communication accommodated in an NF device that does not correspond to the increase or decrease is also distributed to another NF device after rehashing, and session interruption occurs in an NF device that performs state management.

Solution to Problem

In order to solve the above-described problem and achieve the object, an L2 switch of the present invention includes: a reception unit configured to receive a packet of upstream communication and a packet of downstream communication that are transmitted from a network device; a determination unit configured to determine whether or not a packet received by the reception unit is a packet of upstream communication and whether or not the packet is a packet at a session start time; a storing unit configured to, when the determination unit determines that the packet is of upstream communication and is a packet of a session start time, acquire session information and destination information included in the packet of the upstream communication and store into a session table; and an update unit configured to update destination information of the packet to destination information stored in the session table, when the determination unit determines that the packet is of upstream communication and is not a packet at a session start time and the destination information of the packet is different from the destination information stored in the session table.

Advantageous Effects of Invention

According to the present invention, there is an effect that occurrence of session interruption can be prevented even in a change in a network configuration accompanied by increase or decrease of NF devices.

DESCRIPTION OF EMBODIMENTS

Figure 1:
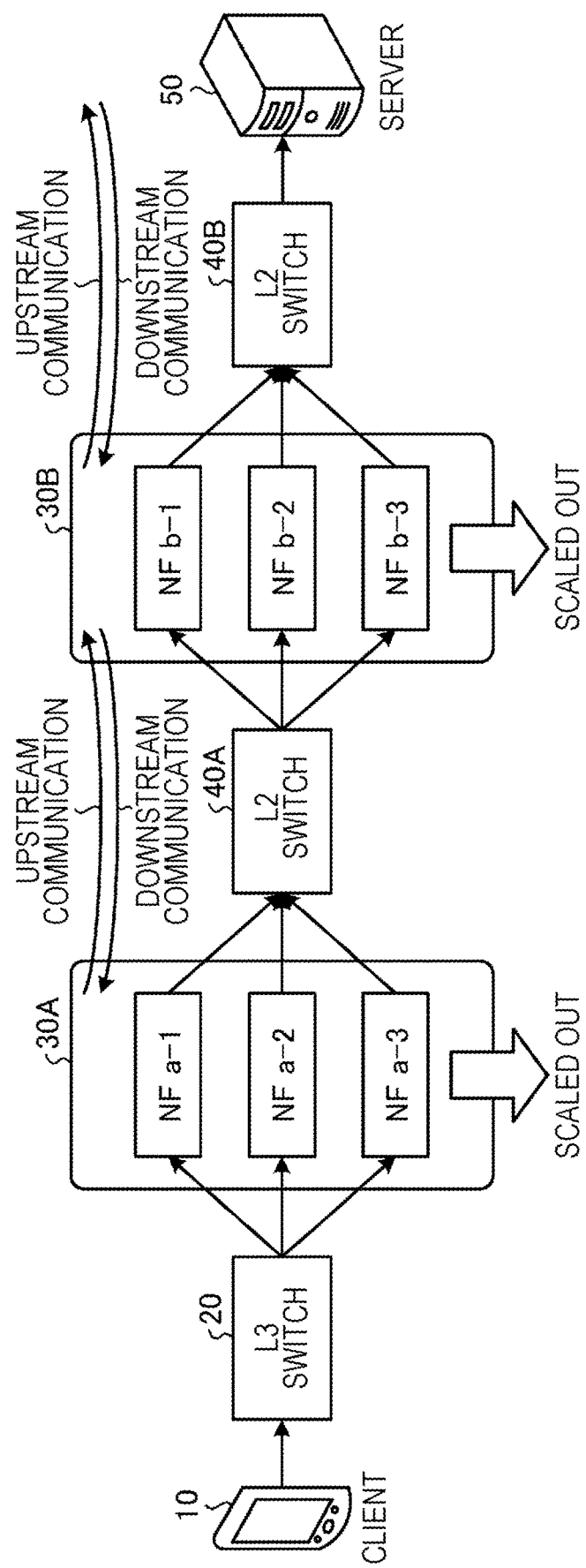
FIG. 1 is a diagram for explaining a basic operation of an L2 switch according to a first embodiment.

Hereinafter, an embodiment of an L2 switch, a communication control method, and a communication control program according to the present application will be described in detail with reference to the drawings. First, an outline of a communication control system according to the present embodiment will be described, and next, a basic operation of a layer 2 (L2) switch will be described. Note that the present invention is not limited to the embodiment described below.

First Embodiment

Hereinafter, an outline of a communication control system and a configuration of an L2 switch according to the present embodiment, and a flow of processing in the present embodiment will be described sequentially, and finally, effects of the present embodiment will be described.

Outline of Communication Control System

First, an outline of a communication control system according to the present embodiment will be described with reference to FIG. 1. The communication control system includes, for example, a client 10, an L3 switch 20, a plurality of NF devices 30A and 30B, L2 switches 40A and 40B, and a server 50. Note that, in the following description, communication from the client 10 to the server 50 is referred to as upstream communication, and communication from the server 50 to the client 10 is referred to as downstream communication. Hereinafter, in a case where a matter common to individual NF devices is described, they are simply referred to as an NF device 30. Further, when a matter common to individual L2 switches is described, they are simply referred to as an L2 switch 40.

The client 10 is a device that communicates with the server 50, and the L3 switch 20 is a device that performs routing of received upstream communication. For example, first, the L3 switch 20 receives upstream communication transmitted from the client 10. Next, the L3 switch 20 transfers the received upstream communication to any of the NF devices 30 connected the self. Further, the NF device 30 transmits the received upstream communication to the server 50 via the L2 switch 40 connected in the subsequent stage.

Next, a basic operation of the L2 switch of the present embodiment will be described with reference to FIG. 1. The L2 switch 40A is connected to, for example, an NF device 30A (NF a-1 to NF a-3) and an NF device 30B (NF b-1 to NF b-3), and transfers communication received from any of the NF devices to the next NF device. Here, for example, in a case where the NF device is a device that provides a function of a load balancer or a firewall, it is necessary to pass through the same NF device in upstream communication and downstream communication.

Therefore, when having received downstream communication for upstream communication, the L2 switch 40A performs the following processing in order to transfer the downstream communication to the same NF device as that of the upstream communication. That is, at a time of receiving upstream communication, the L2 switch 40A stores header information (for example, a transmission source MAC address of the NF a-1) indicating a transmission source of the upstream communication, into a memory unit. Thereafter, at a time of receiving downstream communication, the L2 switch 40A refers to the memory unit (not illustrated), and rewrites the header information of the downstream communication.

For example, the L2 switch 40A rewrites a destination MAC address in the header information of the downstream communication, to a MAC address of the NF a-1. This causes the downstream communication outputted from the L2 switch 40A to reach the NF device (the NF a-1) same as that of the upstream communication.

Note that, in the example of FIG. 1, the L2 switch 40A is installed between the NF devices, but an installation method is not limited to this. For example, the L2 switch 40A may be installed between the NF device and a device other than the NF device (for example, the server 50).

Configuration of L2 Switch

Figure 2:
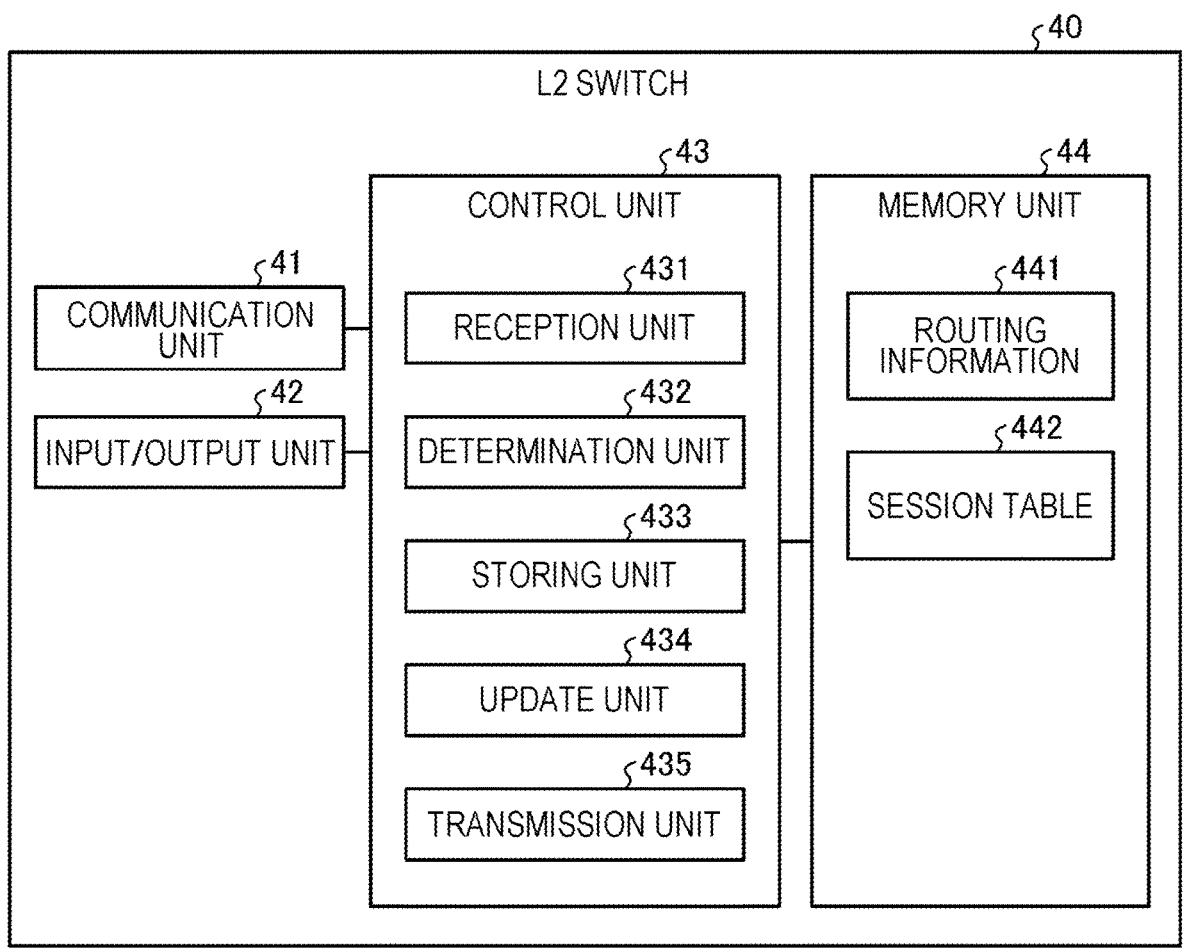
FIG. 2 is a block diagram illustrating a configuration example of the L2 switch according to the first embodiment.

A configuration of the L2 switch 40 will be described in detail with reference to FIG. 2. FIG. 2 is a block diagram illustrating a configuration example of the L2 switch. The L2 switch 40 includes a communication unit 41, an input/output unit 42, a control unit 43, and a memory unit 44.

The communication unit 41 is responsible for a communication interface with an external device. The communication unit 41 receives upstream communication via the NF device 30, and transmits upstream communication outputted from the control unit 43 to the server 50, for example. The input/output unit 42 is responsible for input/output of various types of information to/from the L2 switch 40. The input/output unit 42 receives, for example, an input of setting information or the like to the L2 switch 40.

The control unit 43 is responsible for control of the entire L2 switch 40. The control unit 43 includes a reception unit 431, a determination unit 432, a storing unit 433, an update unit 434, and a transmission unit 435. Here, the control unit 43 is, for example, an electronic circuit such as a central processing unit (CPU) or a micro processing unit (MPU), or an integrated circuit such as an application specific integrated circuit (ASIC) or a field programmable gate array (FPGA).

The reception unit 431 receives a packet of upstream communication and a packet of downstream communication that are transmitted from a network device. For example, the reception unit 431 receives a packet transmitted from the client 10 as an upstream packet via the L3 switch 20 and the NF device 30A. Furthermore, for example, the reception unit 431 receives a packet transmitted from the server 50 as a downstream packet via the L2 switch 40B and the NF device 30B.

The determination unit 432 determines whether or not the packet received by the reception unit 431 is a packet of upstream communication and whether or not the packet is a packet at a session start time. Furthermore, the determination unit 432 further determines whether or not the packet received by the reception unit is a packet at a session end time. Note that the determination method may be any method. For example, the determination unit 432 determines whether or not to be a packet of upstream communication by using the presence or absence of a session table, a physical port number, flag information, or the like. Further, for example, the determination unit 432 determines whether or not flag information is "SYN" in a case of a transmission control protocol (TCP), and determines as a packet at a session start time in a case of "SYN".

Here, the session information is information related to a session and included in a packet, and is, for example, 5-tuple information (a transmission source IP address, a destination IP address, a transmission source port number, a destination port number, and a protocol number) or the like. Furthermore, the destination information is, for example, a transmission source MAC address, a destination Mac address, and the like in the upstream communication.

When the determination unit 432 determines that the packet is of upstream communication and is a packet at a session start time, the storing unit 433 acquires session information and destination information included in the packet of the upstream communication, and stores in the session table. Further, when the determination unit 432 determines as a packet at a session end time, the storing unit 433 deletes session information and destination information that are stored in the session table and correspond to the packet. In addition, the timing of deletion is not limited to this, and for example, the storing unit 433 may delete the session information and the destination information stored in the session table in a case where there is no communication for a certain period of time after the last communication. Specifically, the storing unit 433 may hold a time stamp and collectively delete the session information and the destination information for which there is no communication for a certain period of time.

When the determination unit 432 determines that the packet is of upstream communication and is not a packet at a session start time, and when destination information of the packet is different from destination information stored in the session table, the update unit 434 updates the destination information of the packet to the destination information stored in the session table.

For example, when the determination unit 432 determines that the packet is of upstream communication and is not a packet at a session start time, the update unit 434 searches the session table by using 5-tuple information and the like of the received packet, and acquires a Mac address of a record corresponding to the received packet, from the session table. Then, the update unit 434 determines whether the acquired Mac address and the destination Mac address are the same. As a result, when having determined that the acquired Mac address and the destination Mac address are not the same, the update unit 434 updates the acquired Mac address to the destination Mac address.

In addition, when the received packet is a packet of downstream communication, the update unit 434 searches the session table and acquires a Mac address corresponding to the packet of the corresponding upstream communication. Then, the update unit 434 updates the acquired Mac address to the destination Mac address.

The transmission unit 435 transfers the packet of the upstream communication and the packet of the downstream communication that have been received. For example, when the destination Mac address is updated by the update unit 434, the transmission unit 435 transfers the packet on the basis of the updated destination Mac address.

The memory unit 44 stores various types of information to be referred to when the control unit 43 operates. The memory unit 44 has, for example, an area for storage of routing information 441 and a session table 442. Here, the memory unit 44 is, for example, a semiconductor memory element such as a RAM or a flash memory, or a memory device such as a hard disk or an optical disk. Note that, in the example of FIG. 2, the memory unit 44 is installed inside the L2 switch 40, but may be installed outside the L2 switch 40. Furthermore, a plurality of memory units subjected to scaling out may be installed.

The routing information 441 is information for the L2 switch to perform routing. The routing information 441 is, for example, a routing table in which a port number and a MAC address are associated.

The session table 442 stores, for each session, a transmission source IP address, a destination IP address, a transmission source port number, a destination port number, a protocol number, a transmission source MAC address, and a destination Mac address.

Figure 3:
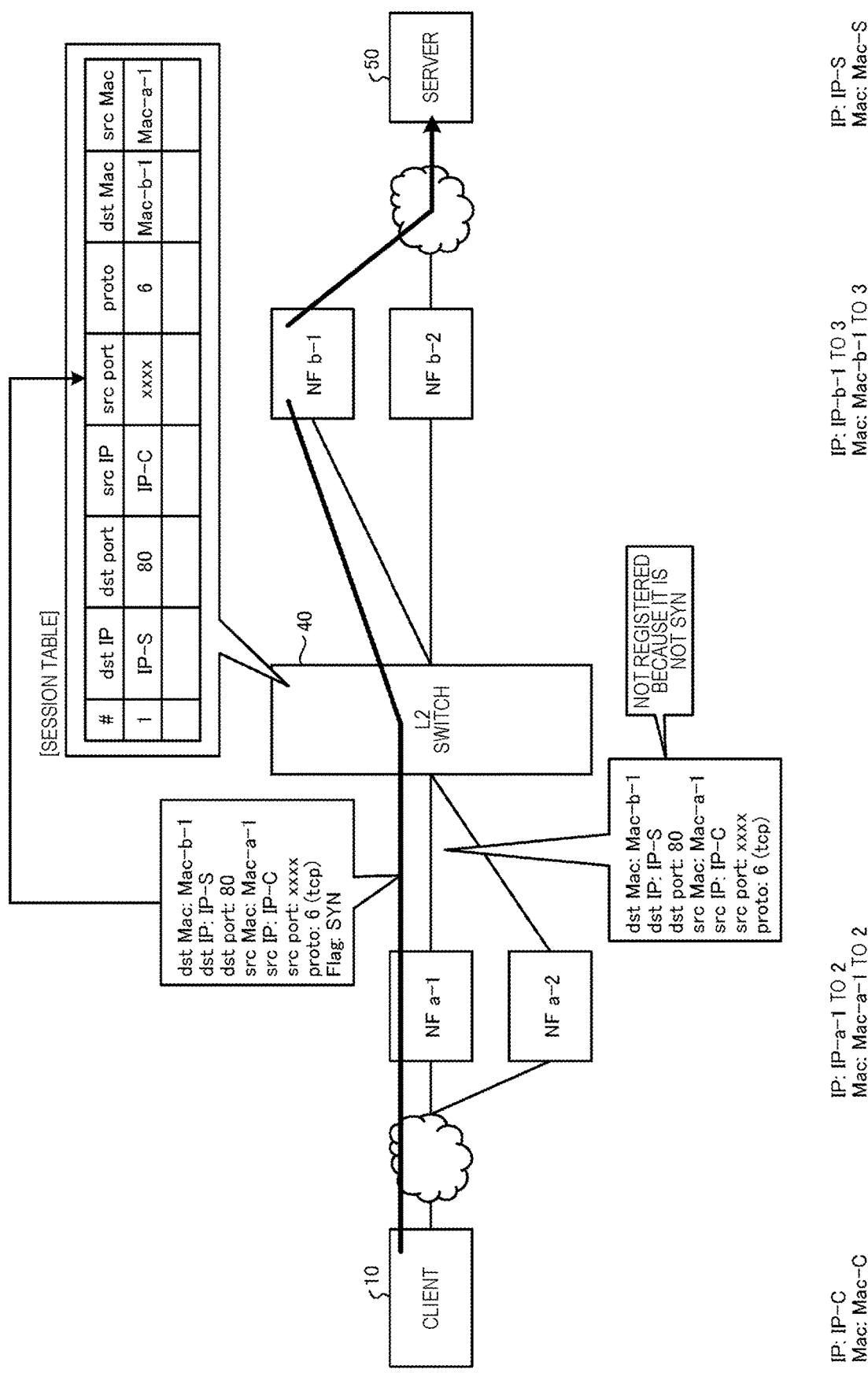
FIG. 3 is a diagram for explaining a processing example when a session start packet of upstream communication is received.
Figure 4:
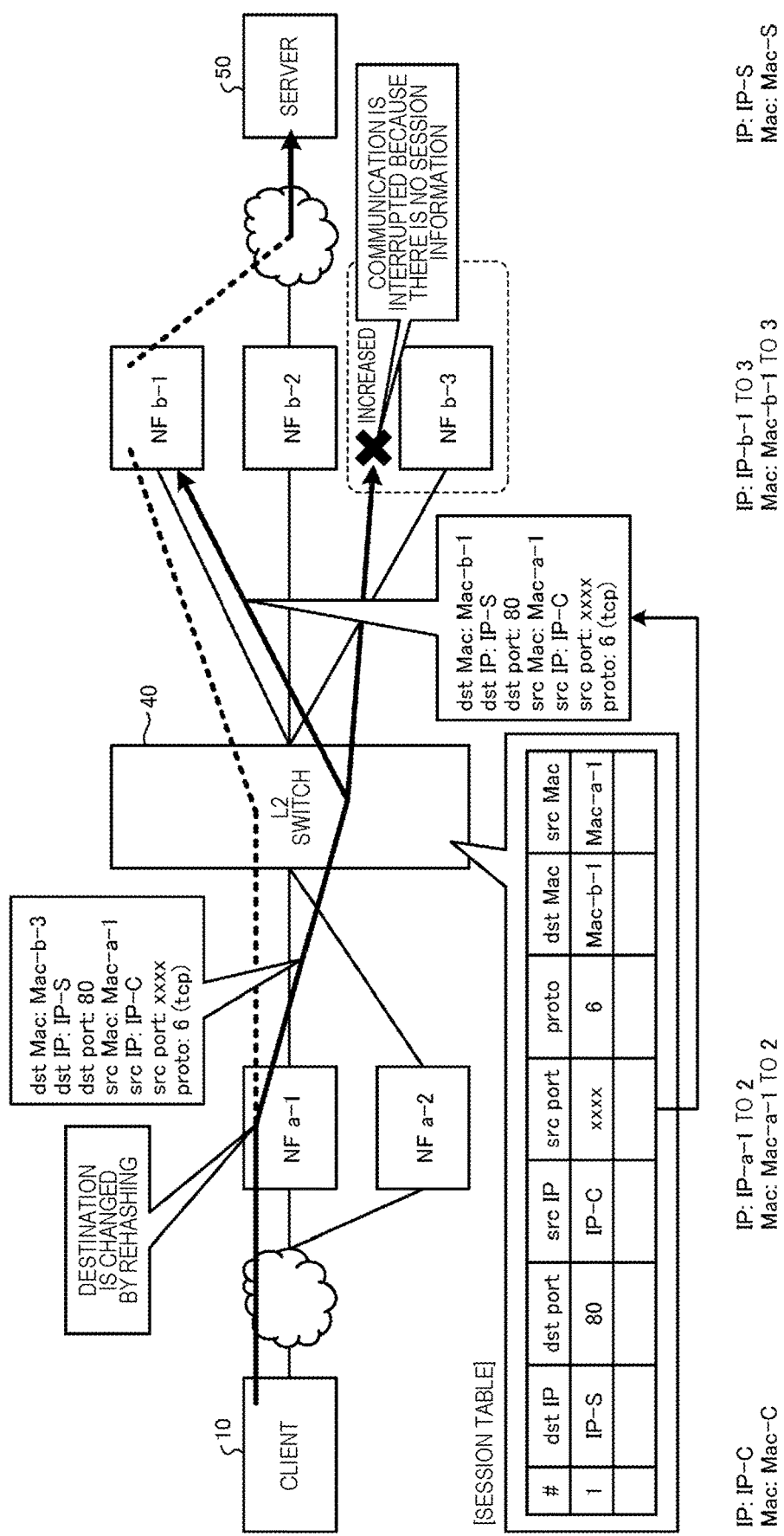
FIG. 4 is a diagram for explaining a processing example when a packet of upstream communication is received after scaling out.
Figure 5:
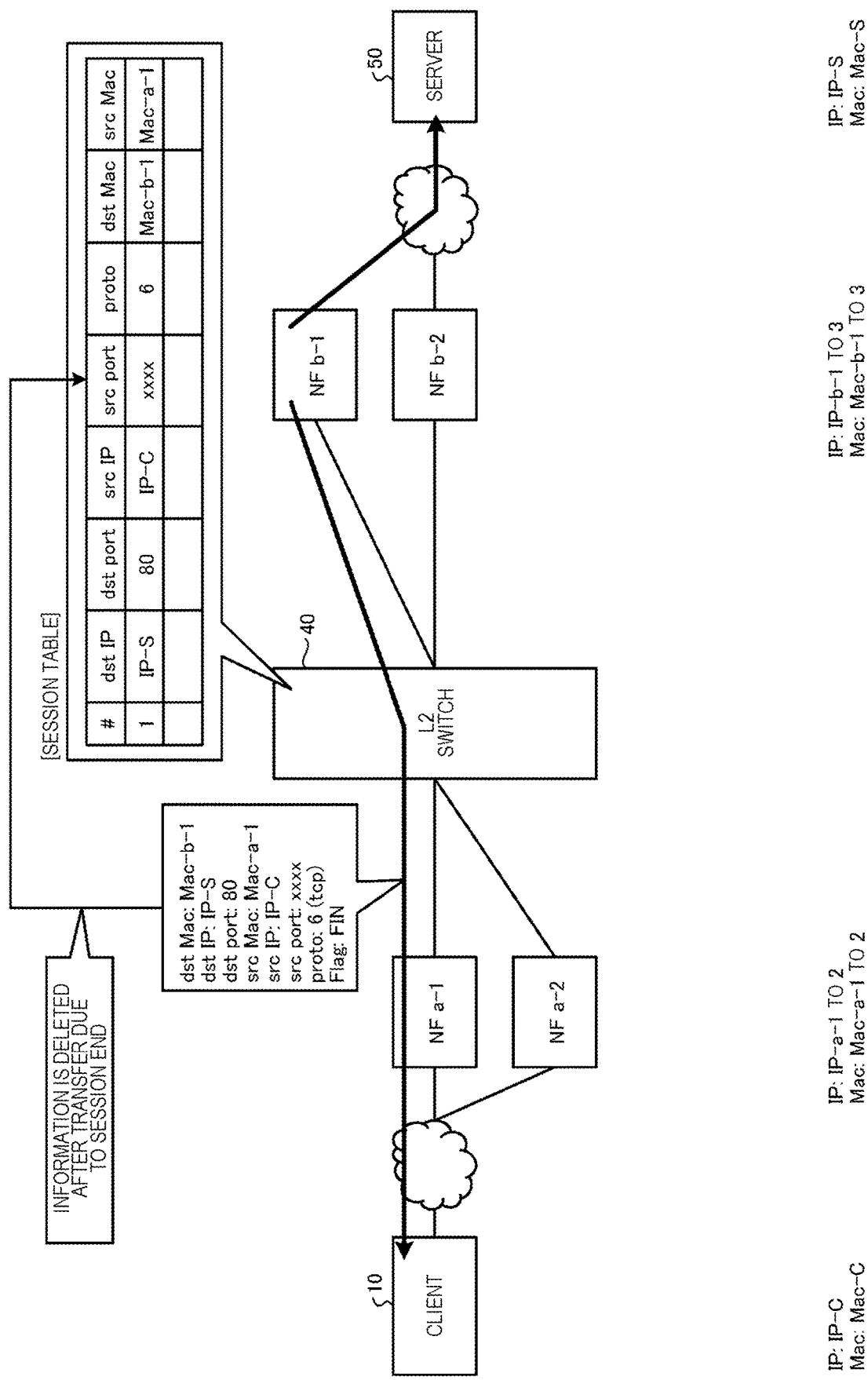
FIG. 5 is a diagram for explaining a processing example when a session end packet of upstream communication is received.

Here, a series of processing of the L2 switch 40 when a packet of upstream communication is received will be described using examples of FIGS. 3 to 5. FIG. 3 is a diagram for explaining a processing example when a session start packet of upstream communication is received. FIG. 4 is a diagram for explaining a processing example when a packet of upstream communication is received after scaling out. FIG. 5 is a diagram for explaining a processing example when a session end packet of upstream communication is received.

As exemplified in FIG. 3, when having received a packet with flag information "SYN" in upstream communication, the L2 switch 40 determines that a session start packet has been received, and acquires 5-tuple information, a transmission source MAC address, and a destination Mac address from the packet. Then, the L2 switch 40 stores the 5-tuple information, the transmission source MAC address, and the destination Mac address into the session table. Note that, here, the destination Mac address is assumed to be "Mac-b-1".

Thereafter, as exemplified in FIG. 4, an NF device (NF b-3) is added by scaling out. Here, in the example of FIG. 4, in an NF device (NF a-1), a destination is changed to an NF device (NF b-3) by rehashing in consideration of the added NF device (NF b-3). Since the destination of the session whose destination is assigned to the NF device (NF b-1) until before the addition of the NF device (NF b-3) is changed to the NF device (NF b-3), session interruption will occur if nothing is done.

Therefore, as exemplified in FIG. 4, the L2 switch 40 searches the session table by using 5-tuple information and the like of the packet of the upstream communication, acquires the destination Mac address "Mac-b-1" of the searched record, and updates the destination Mac address of the packet to "Mac-b-1" to transfer the packet to the NF device (NF b-1). This allows the L2 switch 40 to maintain communication without causing session interruption.

Next, as exemplified in FIG. 5, when having received a packet whose flag information is "FIN", the L2 switch 40 determines that a session end packet has been received, transfers the packet to the NF device (NF b-1), and then deletes a corresponding record in the session table.

Figure 6:
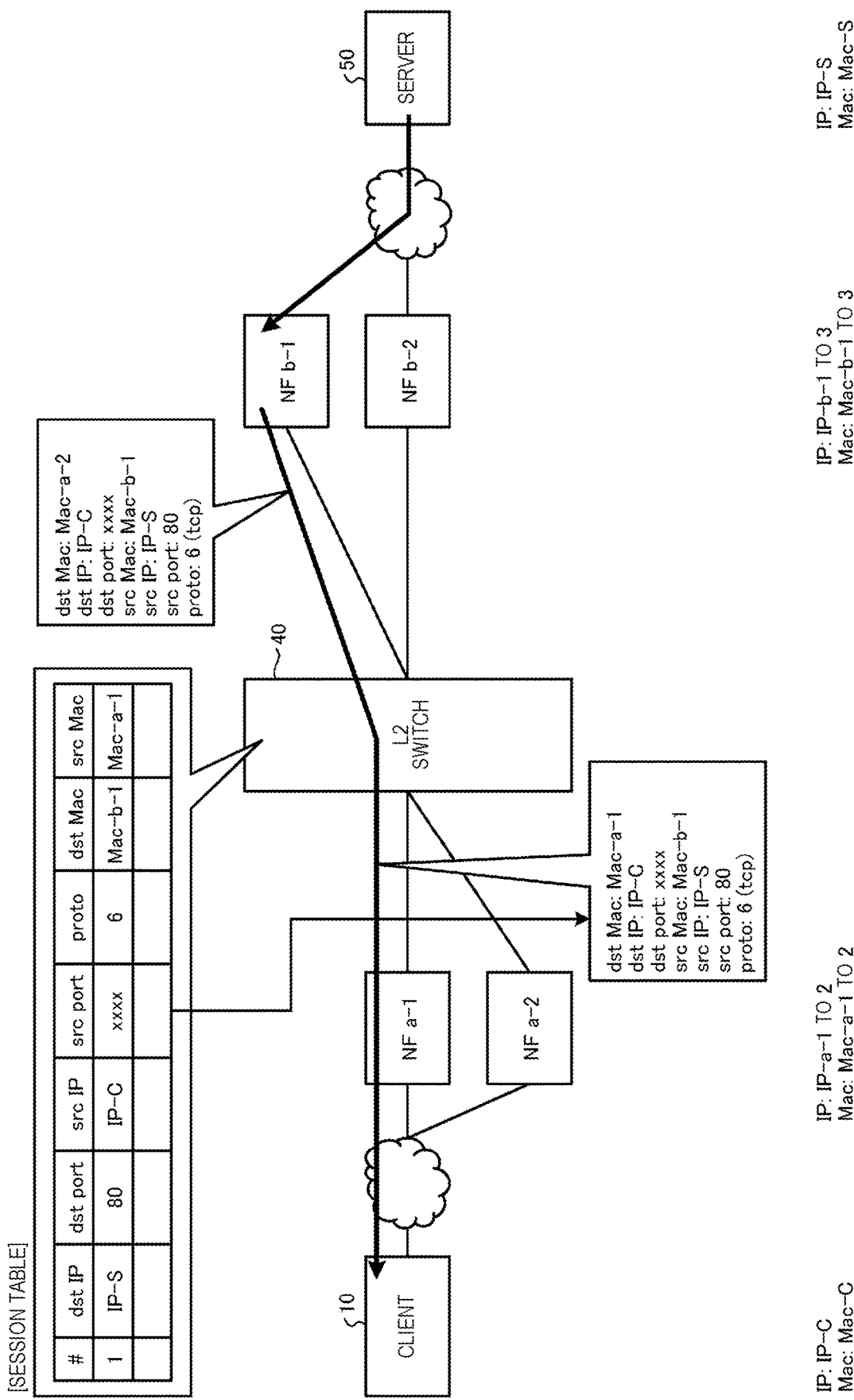
FIG. 6 is a diagram for explaining a processing example when a packet of downstream communication is received.

Next, processing of the L2 switch 40 when a packet of downstream communication is received will be described using an example of FIG. 6. As exemplified in FIG. 6, when having received a packet of downstream communication, the L2 switch 40 searches the session table by using 5-tuple information and the like, and acquires a Mac address "Mac-a-1" from a record corresponding to the upstream communication. Then, the L2 switch 40 updates the acquired Mac address "Mac-a-1" to a destination Mac address, to transfer the packet to the NF device (NF a-1) same as that of the upstream communication.

Processing Procedure of L2 Switch

Figure 7:
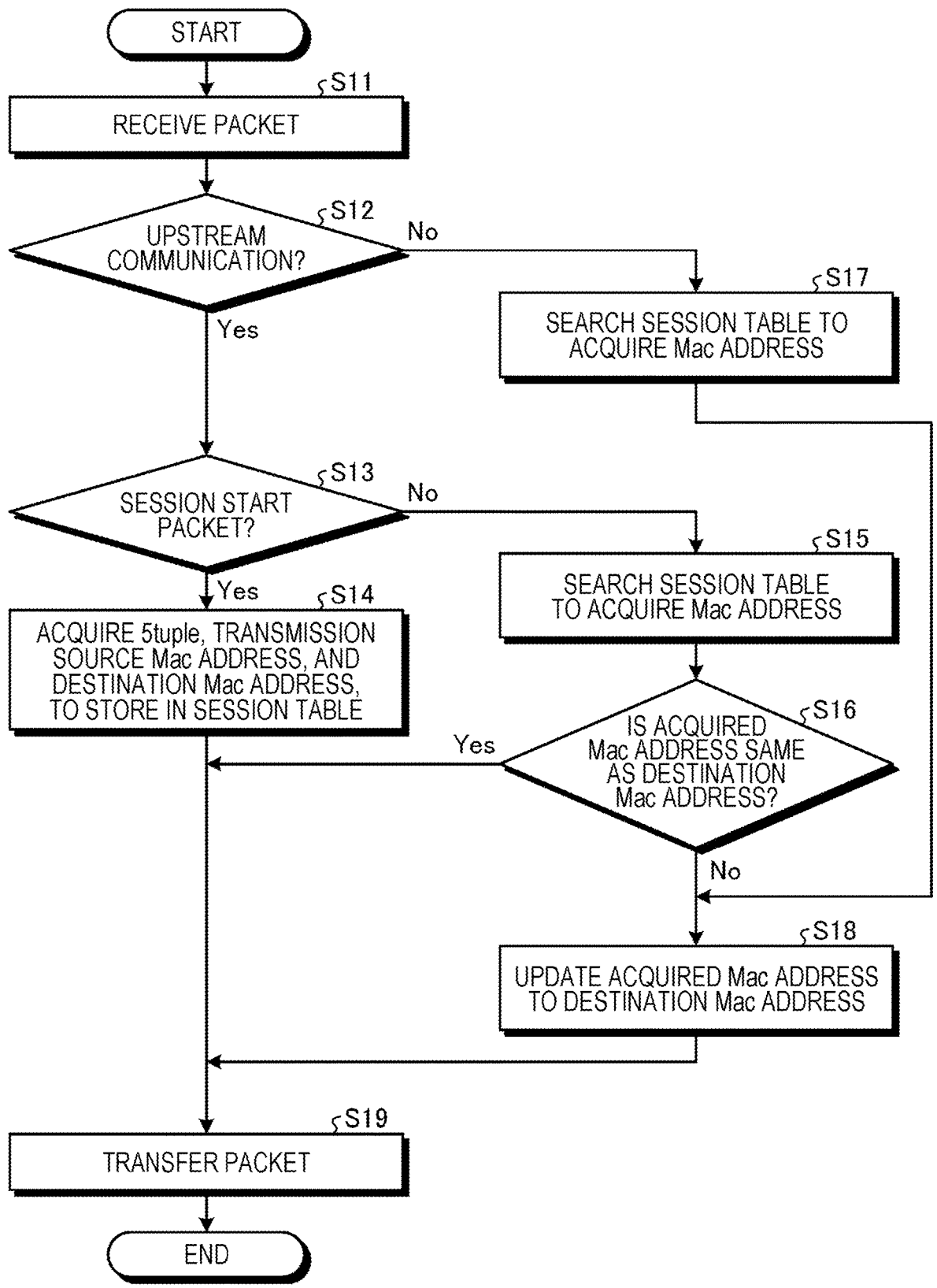
FIG. 7 is a flowchart illustrating an example of a processing procedure of the L2 switch according to the first embodiment.

Next, an example of a processing procedure by the L2 switch 40 according to the first embodiment will be described with reference to FIG. 7. FIG. 7 is a flowchart illustrating an example of a processing procedure of the L2 switch according to the first embodiment.

As exemplified in FIG. 7, when the reception unit 431 of the L2 switch 40 receives a packet (step S11), the determination unit 432 determines whether or not the packet is of upstream communication (step S12). When having determined that the packet is of upstream communication (Yes in step S12), the determination unit 432 determines whether or not to be a session start packet (step S13).

Then, when having determined as a session start packet (Yes in step S13), the determination unit 432 acquires 5-tuple information, a transmission source MAC address, and a destination Mac address, and stores in the session table (step S14). Then, the transmission unit 435 transfers the packet on the basis of the destination Mac address and the like (step S19).

Further, when the determination unit 432 determines in step S13 that the packet is not a session start packet (No in step S13), the session table is searched by using the 5-tuple information and the like of the received packet, and a Mac address of a record corresponding to the received packet is acquired from the session table (step S15).

Then, the update unit 434 determines whether the acquired Mac address and the destination Mac address are the same (step S16). As a result, when the update unit 434 determines that the acquired Mac address and the destination Mac address are the same (Yes in step S16), the transmission unit 435 transfers the packet on the basis of the destination Mac address and the like (step S19).

In addition, when having determined that the acquired Mac address and the destination Mac address are not the same (No in step S16), the update unit 434 updates the acquired Mac address to the destination Mac address (step S18). Then, the transmission unit 435 transfers the packet on the basis of the destination Mac address and the like (step S19).

Further, when the determination unit 432 determines that the packet is not of the upstream communication in step S12 (No in step S12), the update unit 434 searches the session table by using the 5-tuple information and the like of the received packet, and acquires a Mac address of a record corresponding to the received packet from the session table (step S17). Then, the update unit 434 updates the acquired Mac address to the destination Mac address (step S18). Then, the transmission unit 435 transfers the packet on the basis of the destination Mac address and the like (step S19).

Effects of First Embodiment

As described above, the L2 switch 40 receives a packet of upstream communication and a packet of downstream communication that are transmitted from a network device. Further, in a case where it is determined whether or not the received packet is a packet of upstream communication, and when it is determined that the packet is of upstream communication and is a packet at a session start time, the L2 switch 40 acquires session information and destination information included in the packet of the upstream communication, and stores in the session table. Further, when it is determined that the packet is of upstream communication and is not a packet at a session start time, and the destination information of the packet is different from destination information stored in the session table, the L2 switch 40 updates the destination information of the packet to the destination information stored in the session table. Therefore, the L2 switch 40 can prevent occurrence of the session interruption even in a change in the network configuration accompanied by increase or decrease of the NF device.

Figure 8:
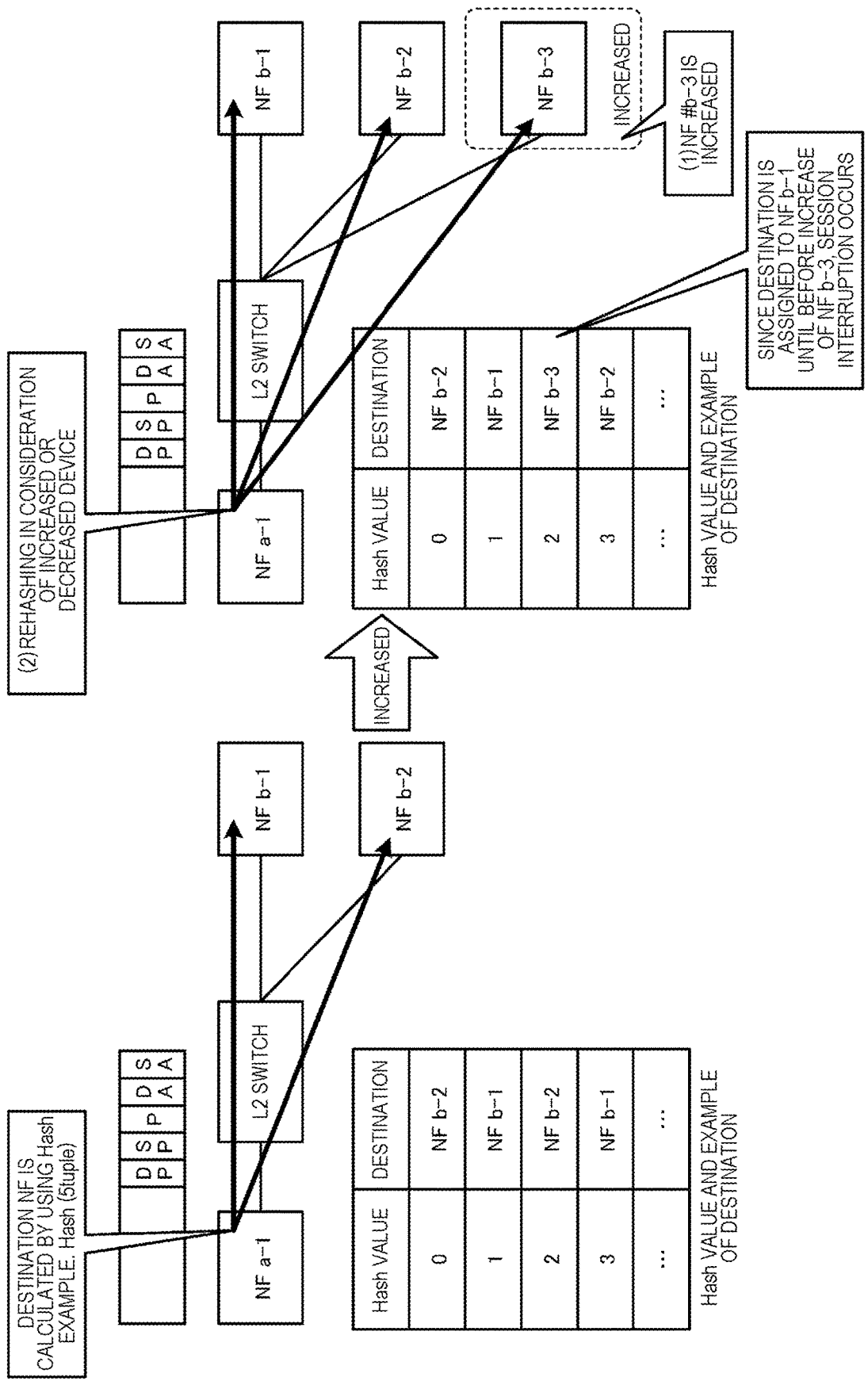
FIG. 8 is a diagram for explaining a problem of a conventional technology.

That is, in the NF device of the conventional case, as exemplified in FIG. 8, a destination NF device is determined by hash calculation. Therefore, when the NF device (NF b-3) is added by scaling out (see (1) of FIG. 8), rehashing is performed in consideration of the added NF device (NF b-3) (see (2) of FIG. 8). At this time, the destination may be allocated to another NF device by rehashing. That is, in the example of FIG. 8, for a hash value "2", the destination has been assigned to the NF device (NF b-1) until before addition of the NF device (NF b-3), but the destination is changed to the NF device (NF b-3), which has caused occurrence of session interruption.

Figure 9:
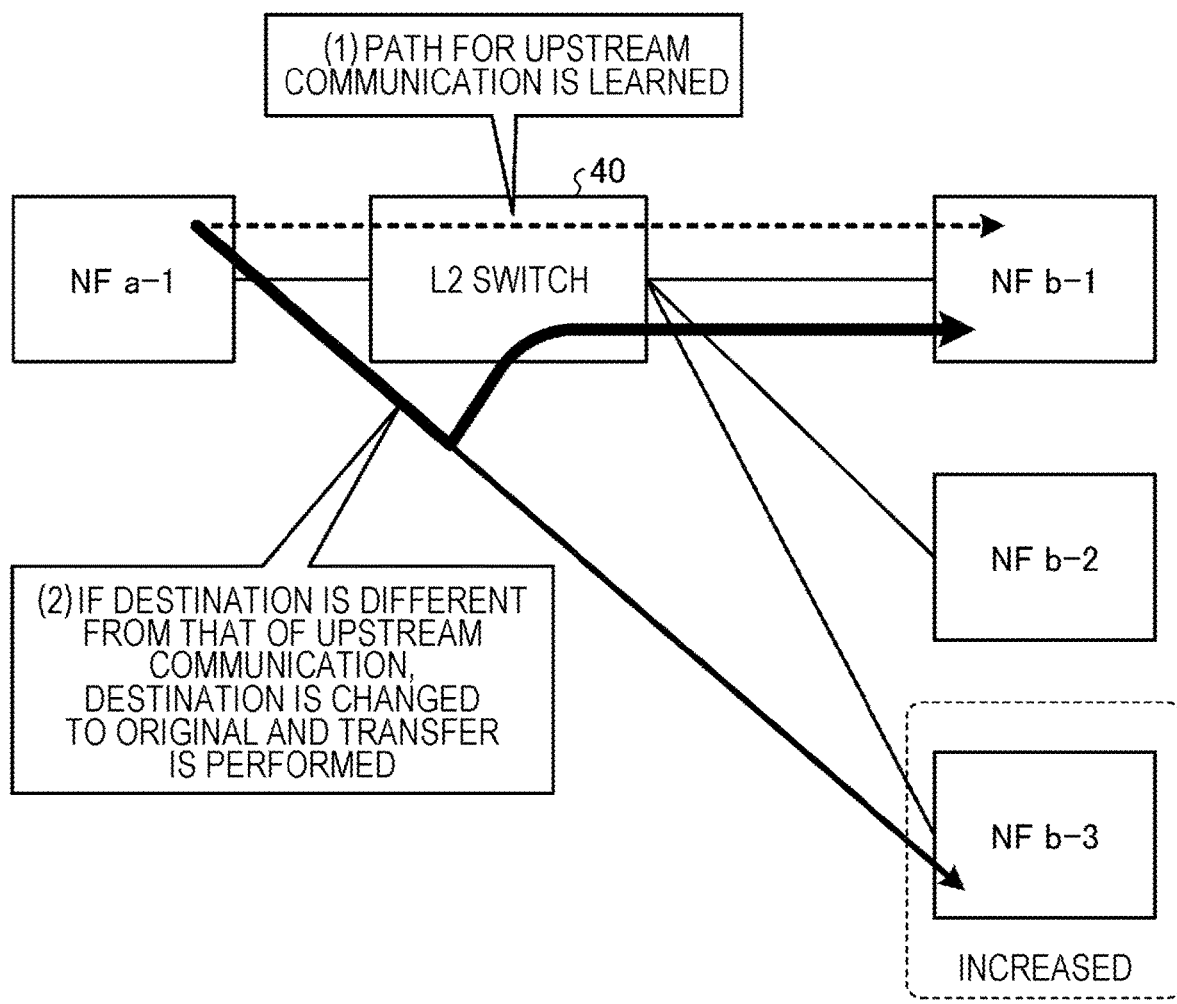
FIG. 9 is a diagram for explaining an effect of the L2 switch according to the first embodiment.

Therefore, as exemplified in FIG. 9, when having received a session start packet of upstream communication, the L2 switch 40 learns a path for upstream communication (see (1) in FIG. 9). That is, when having received the session start packet of the upstream communication, the L2 switch 40 stores session information and destination information into the session table. Then, if the destination is different from that of the upstream communication, the L2 switch 40 changes to the original communication to transfer the packet (see (2) of FIG. 9). Therefore, even in a change in a network configuration accompanied by increase or decrease of the NF device, it is possible to maintain the symmetry of the up/down communication and not to affect the communication.

System Configuration and Other

In addition, each component of each device that has been illustrated is functionally conceptual, and is not necessarily physically configured as illustrated. That is, a specific form of distribution and integration of individual devices is not limited to the illustrated form, and all or a part thereof can be functionally or physically distributed and integrated in any unit according to various loads, usage conditions, and the like. Furthermore, all or any part of each processing function performed in each device can be realized by a CPU and a program analyzed and executed by the CPU, or can be realized as hardware by wired logic.

Further, among the individual processes described in the present embodiment, all or some of the processes described as being performed automatically can be performed manually, or all or some of the processes described as being performed manually can be performed automatically by a known method. In addition, the processing procedure, the control procedure, the specific name, and the information including various data and parameters illustrated in the document and the drawings can be freely changed unless otherwise specified.

[Program]

In addition, it is also possible to create a program in which the processing executed by the L2 switch 40 described in the embodiment described above is described in a language that can be executed by a computer. In this case, by the computer executing the program, the effects similar to those of the embodiment described above can be obtained. Further, the program may be recorded in a computer-readable recording medium, and the program recorded in the recording medium may be read and executed by the computer to implement processing similar to the embodiment described above.

Figure 10:
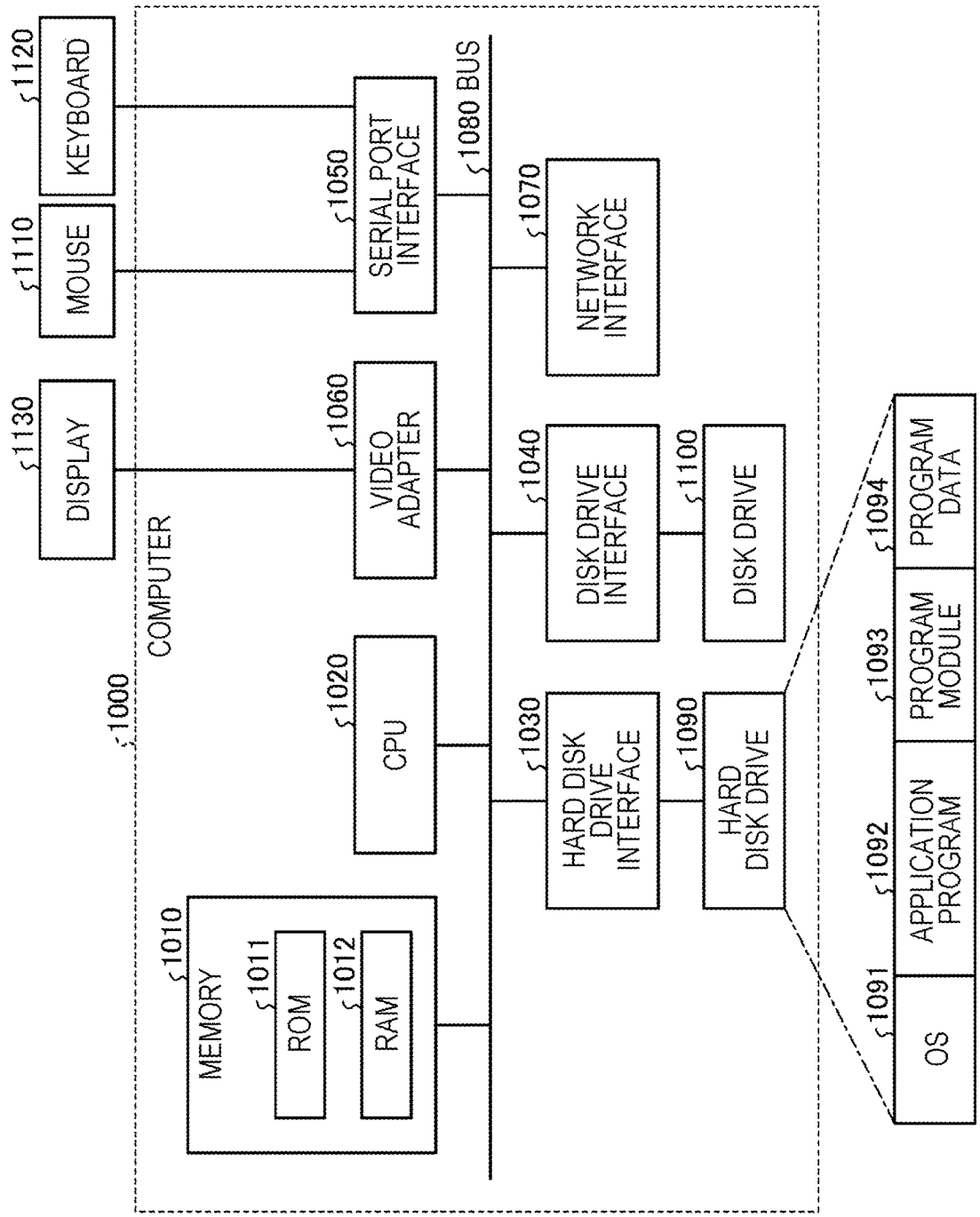
FIG. 10 is a diagram illustrating a computer that executes a program.

FIG. 10 is a diagram illustrating a computer that executes a program. As exemplified in FIG. 10, a computer 1000 includes, for example, a memory 1010, a central processing unit (CPU) 1020, a hard disk drive interface 1030, a disk drive interface 1040, a serial port interface 1050, a video adapter 1060, and a network interface 1070, and these individual units are connected by a bus 1080.

As exemplified in FIG. 10, the memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090 as exemplified in FIG. 10. The disk drive interface 1040 is connected to a disk drive 1100 as exemplified in FIG. 10. For example, a removable storage medium such as a magnetic disk or an optical disk is inserted into the disk drive 1100. As exemplified in FIG. 10, the serial port interface 1050 is connected to, for example, a mouse 1110 and a keyboard 1120. As exemplified in FIG. 10, the video adapter 1060 is connected to, for example, a display 1130.

Here, as exemplified in FIG. 10, the hard disk drive 1090 stores, for example, an OS 1091, an application program 1092, a program module 1093, and program data 1094. That is, the above program is stored, for example, in the hard disk drive 1090 as a program module in which a command executed by the computer 1000 is described.

Further, the various data described in the embodiment described above are stored as program data in, for example, the memory 1010 and the hard disk drive 1090. Then, the CPU 1020 reads out the program module 1093 and the program data 1094 stored in the memory 1010 and the hard disk drive 1090 to the RAM 1012 as necessary, and executes various processing procedures.

Note that the program module 1093 and the program data 1094 related to the program are not limited to being stored in the hard disk drive 1090, and may be stored in, for example, a storage medium that is detachably attachable, and read by the CPU 1020 via a disk drive or the like. Alternatively, the program module 1093 and the program data 1094 related to the program may be stored in another computer connected via a network (such as local area network (LAN) or a wide area network (WAN)) and read by the CPU 1020 via the network interface 1070.

The embodiment described above and modifications thereof are included in the invention described in the claims and the equivalent scope thereof similarly to being included in the technology disclosed in the present application.

REFERENCE SIGNS LIST

10 Client
20 L3 switch
30, 30A, 30B NF device
40, 40A, 40B L2 switch
41 Communication unit
42 Input/output unit
43 Control unit
431 Reception unit
432 Determination unit
433 Storing unit
434 Update unit
435 Transmission unit
44 Memory unit
441 Routing information
443 Session table
50 Server

The invention claimed is:

1. A layer 2 (L2) switch comprising one or more processors configured to:
   receive a first packet from a network device;
   determine whether or not the received first packet is a packet of upstream communication and whether or not the first packet is a packet at a session start time;
   in response to determining that the received first packet is of upstream communication and is a packet of a session start time, acquire and store session information and destination MAC information included in the first packet of the upstream communication into a session table;
   receive a second packet;
   determine, based on the session information stored in the session table and information included in the second packet, that the received second packet is in the same session as the first packet based on that the second packet is of the upstream communication and is not a packet at a session start time;
   obtain a destination MAC address from the second packet;
   determine that the destination MAC address of the second packet is different from the destination MAC address of the first packet stored in the session table;
   in response to determining that (i) the second packet is in the same session as the first packet and (ii) the destination MAC address of the second packet is different from the destination MAC address of the first packet, replace the destination MAC address of the second packet with the destination MAC address of the first packet stored in the session table; and
   transmit the second packet to a network function device according to the destination MAC address in the second packet.

2. The L2 switch according to claim 1, wherein the one or more processors are further configured to:
   determine whether or not a received packet of upstream communication is a packet at a session end time; and
   in response to determining that the received packet is a packet at a session end time, delete the session information and the destination information that are stored in the session table and correspond to the packet.

3. The L2 switch according to claim 1, wherein the one or more processors are further configured to:
   in response to determining that a received packet is a packet of downstream communication, search a session table to acquire destination information corresponding to a packet of corresponding upstream communication, and update destination information of the packet of the downstream communication to the acquired destination information.

4. A communication control method comprising:
   receiving, by a layer 2 (L2) switch, a first packet from a network device;
   determining whether or not the received first packet is a packet of upstream communication and whether or not the first packet is a packet at a session start time;
   acquiring and storing session information and destination MAC information included in the first packet of the upstream communication into a session table, in response to determining that the received first packet is of upstream communication and is a packet of a session start time;
   receiving a second packet;
   determining, based on the session information stored in the session table and information included in the second packet, that the received second packet is in the same session as the first packet based on that the second packet is of the upstream communication and is not a packet at a session start time;

obtaining a destination MAC address from the second packet;

determining that the destination MAC address of the second packet is different from the destination MAC address of the first packet stored in the session table;

in response to determining that (i) the second packet is in the same session as the first packet and (ii) the destination MAC address of the second packet is different from the destination MAC address of the first packet, replacing the destination MAC address of the second packet with the destination MAC address of the first packet stored in the session table; and transmitting the second packet to a network function device according to the destination MAC address in the second packet.

5. A non-transitory computer readable medium storing one or more instructions causing a computer to execute:

receiving, by a layer 2 (L2) switch, a first packet from a network device;

determining whether or not the received first packet is a packet of upstream communication and whether or not the first packet is a packet at a session start time;

acquiring and storing session information and destination MAC information included in the first packet of the upstream communication into a session table, in response to determining that the received first packet is of upstream communication and is a packet of a session start time;

receiving a second packet;

determining, based on the session information stored in the session table and information included in the second packet, that the received second packet is in the same session as the first packet based on that the second packet is of the upstream communication and is not a packet at a session start time;

obtaining a destination MAC address from the second packet;

determining that the destination MAC address of the second packet is different from the destination MAC address of the first packet stored in the session table;

in response to determining that (i) the second packet is in the same session as the first packet and (ii) the destination MAC address of the second packet is different from the destination MAC address of the first packet, replacing the destination MAC address of the second packet with the destination MAC address of the first packet stored in the session table; and transmitting the second packet to a network function device according to the destination MAC address in the second packet.

6. The communication control method according to claim 4, further comprising:

determining whether or not a received packet of upstream communication is a packet at a session end time; and in response to determining that the received packet is a packet at a session end time, deleting the session information and the destination information that are stored in the session table and correspond to the packet.

7. The communication control method according to claim 4, further comprising:

in response to determining that a received packet is a packet of downstream communication, searching a session table to acquire destination information corresponding to a packet of corresponding upstream communication, and updating destination information of the packet of the downstream communication to the acquired destination information.

8. The non-transitory computer readable medium according to claim 5, wherein the one or more instructions further cause the computer to execute:

determining whether or not a received packet of upstream communication is a packet at a session end time; and in response to determining that the received packet is a packet at a session end time, deleting the session information and the destination information that are stored in the session table and correspond to the packet.

9. The non-transitory computer readable medium according to claim 5, wherein the one or more instructions further cause the computer to execute:

in response to determining that a received packet is a packet of downstream communication, searching a session table to acquire destination information corresponding to a packet of corresponding upstream communication, and updating destination information of the packet of the downstream communication to the acquired destination information.

* * * * *